United States Patent
Gandhi et al.

(10) Patent No.: US 10,754,962 B2
(45) Date of Patent: Aug. 25, 2020

(54) SYSTEM FOR SECURE CONTEXT-AWARE PASSWORD MANAGEMENT

(71) Applicant: BlackBerry Limited, Waterloo (CA)

(72) Inventors: Shivangi Anantrupa Gandhi, Brampton (CA); Kristof Takacs, Waterloo (CA); Neil Patrick Adams, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 173 days.

(21) Appl. No.: 15/380,791

(22) Filed: Dec. 15, 2016

(65) Prior Publication Data
US 2018/0173883 A1   Jun. 21, 2018

(51) Int. Cl.
*G06F 21/60*  (2013.01)
*G06F 21/32*  (2013.01)
(Continued)

(52) U.S. Cl.
CPC ...... *G06F 21/604* (2013.01); *G06F 16/90344* (2019.01); *G06F 21/32* (2013.01);
(Continued)

(58) Field of Classification Search
CPC ........ G06F 21/604; G06F 21/32; G06F 21/45; H04M 1/72586; H04W 12/06
See application file for complete search history.

(56) References Cited

U.S. PATENT DOCUMENTS

| 7,149,296 B2 | 12/2006 | Brown et al. |
| 7,698,221 B2 | 4/2010 | Blinn et al. |

(Continued)

FOREIGN PATENT DOCUMENTS

| EP | 2642778 | 3/2012 |
| EP | 2905714 | 8/2015 |
| EP | 3337209 A1 | 6/2018 |

OTHER PUBLICATIONS

Extended European Search Report and Search Opinion for European Patent Application No. 17204207.9, dated Apr. 13, 2018.
(Continued)

*Primary Examiner* — Saleh Najjar
*Assistant Examiner* — Devin E Almeida
(74) *Attorney, Agent, or Firm* — Jose Gutman; Fleit Intellectual Property Law

(57) ABSTRACT

A method, electronic device, and computer readable storage medium, for secure context-aware management of passwords stored in a password manager application in an electronic device. The password manager application prompts for entry of a password at a first user interface to unlock display of sensitive information in a second user interface. A first portion of the sensitive information is displayed in a prioritized list in the unlocked second user interface, with the second portion of the sensitive information remaining user inaccessible, only while the password manager application is in a certain password access context based on contextual information in the electronic device. The contextual information can be any combination of a current geolocation of the device, a current time, an identification of an access point in a vicinity of the device, and other contextual information.

20 Claims, 6 Drawing Sheets

(51) Int. Cl.
*G06F 21/45* (2013.01)
*G06F 16/903* (2019.01)
*H04M 1/725* (2006.01)
*H04M 1/66* (2006.01)
*H04W 12/06* (2009.01)

(52) U.S. Cl.
CPC .............. *G06F 21/45* (2013.01); *H04M 1/66* (2013.01); *H04M 1/72586* (2013.01); *H04W 12/0608* (2019.01); *G06F 2221/2111* (2013.01)

(56) References Cited

U.S. PATENT DOCUMENTS

| | | | |
|---|---|---|---|
| 8,051,098 B2 | 11/2011 | Bisbee et al. | |
| 8,165,961 B1 | 4/2012 | DiMartino et al. | |
| 8,200,582 B1 | 6/2012 | Zhu | |
| 8,639,928 B2 | 1/2014 | Bursell | |
| 8,738,934 B2* | 5/2014 | Lurey | G06F 21/31 713/193 |
| 9,060,273 B2 | 6/2015 | Brown et al. | |
| 9,137,238 B1* | 9/2015 | Jakobsson | H04L 63/083 |
| 9,166,962 B2 | 10/2015 | Goldsmith et al. | |
| 9,218,474 B1* | 12/2015 | Roth | G06F 21/32 |
| 9,246,979 B2* | 1/2016 | Bomgaars | H04L 41/22 |
| 9,292,670 B2 | 3/2016 | Gupta et al. | |
| 9,292,845 B2 | 3/2016 | Phillips | |
| 9,374,369 B2 | 6/2016 | Mahaffey et al. | |
| 9,898,642 B2* | 2/2018 | Han | G06F 21/41 |
| 2012/0297190 A1* | 11/2012 | Shen | H04L 9/0866 713/168 |
| 2014/0157390 A1* | 6/2014 | Lurey | G06F 21/123 726/7 |
| 2015/0074615 A1* | 3/2015 | Han | H04W 12/06 715/863 |
| 2015/0089620 A1* | 3/2015 | Manza | H04L 63/0838 726/8 |
| 2015/0135021 A1* | 5/2015 | Robison | G06F 21/6263 714/55 |
| 2015/0227926 A1* | 8/2015 | Grigg | G06Q 20/32 705/64 |
| 2015/0286813 A1* | 10/2015 | Jakobsson | G06F 21/35 726/9 |
| 2015/0304292 A1* | 10/2015 | Dulkin | H04L 63/0281 726/7 |
| 2016/0042164 A1 | 2/2016 | Goldsmith et al. | |
| 2016/0234198 A1* | 8/2016 | Breiman | H04L 63/0815 |
| 2016/0301675 A1* | 10/2016 | Wiles | H04L 63/083 |
| 2016/0308876 A1* | 10/2016 | Smith, III | H04L 63/102 |
| 2017/0289168 A1* | 10/2017 | Bar | H04L 63/0853 |
| 2017/0300687 A1* | 10/2017 | Cherukuri | G06F 21/45 |
| 2017/0346851 A1* | 11/2017 | Drake | H04L 63/1466 |

OTHER PUBLICATIONS

Pinola, Melanie, "Which Password Manager Is the Most Secure?", published at https://lifehacker.com/5944969/5944969/which-password-manager-is-the-most-secure, downloaded on Jun. 22, 2017.
Staikos, et al., "The KWallet Handbook," Jan. 1, 2003, published at https://docs.kde.org/stable5/en/kdeutils/kwallet5/kwallet5.pdf; downloaded on Apr. 3, 2018.
Communication Under Rule 71(3) EPC for corresponding European Patent Application No. 17204207.9 dated Mar. 6, 2020.
Jonnalagadda, H., "Password-free logins are coming to an Android phone near you this year", May 24, 2016, http://www.androidcentral.com/password-freelogins-are-coming-android-phone-near-you-year, pp. 1-2.
Perez, S., "Google plans to bring password-free logins to Android apps by year-end", May 23, 2016, https://techcrunch.com/2016/05/23/google-plansto-bring-password-free-logins-to-android-appsby-year-end/, pp. 1-8.
Wikipedia, "Wallet (application)", https://en.wikipedia.org/wiki/Wallet_(application), last visited on Dec. 14, 2016, pp. 1-3.
Wikipedia, "Apple Pay", https://en.wikipedia.org/wiki/Apple_Pay, last visited on Dec. 14, 2016, pp. 1-10.
Wikipedia, "Google Wallet", https://en.wikipedia.org/wiki/Google_Wallet, last visited on Dec. 14, 2016, pp. 1-5.

* cited by examiner

SYSTEM FOR SECURE CONTEXT-AWARE PASSWORD MANAGEMENT

FIELD OF THE DISCLOSURE

The present disclosure generally relates to context-aware password access security, and more particularly to presenting, based on user context, user-relevant passwords at a secure user interface, while protecting from user access at the secure user interface other passwords, in a password manager application in an electronic device.

BACKGROUND

In the realm of password manager applications in an electronic device, user password-unlock access to a password manager application has provided indiscriminate access to all password records for a user. Both relevant password records and irrelevant password records have been provided at a user interface of a password manager application in the electronic device. This has resulted in extra burden on a user to find the most relevant password records for a particular context for the user. It has also caused unnecessary loss of security (by being made accessible at the user interface) for other password records that are irrelevant for the particular context for the user.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
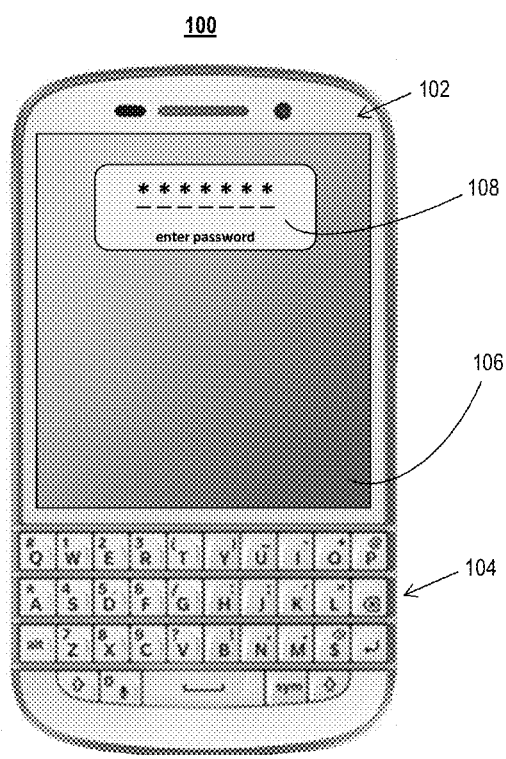
FIG. 1 is an illustration of a first user interface of an electronic device, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected", although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

Passcodes, passwords, PINs, and passphrases are all character strings used for authentication and access. Generally, people use the term "PIN" to designate a three or four-digit numeric string and refer to a password as a longer character string containing letters and other displayable characters. However, for the purposes of this discussion, passcodes, PINs, passphrases, and passwords are treated as interchangeable and the general term "password" is used for brevity.

A password manager application is often used in electronic devices to securely store password records, and often storing a large number of various password records, for a user of the electronic device. A password record can store sensitive information, which may include password information and/or other sensitive information (e.g., private and confidential information) that may be relevant to a user. For example, and not for any limitation, a password record may store a password for online access to a bank account, bank account number and other bank account identifying information, a description of the bank account money contents, and other related financial information. All of this stored information is considered sensitive information of the user of the password manager application and electronic device. Sensitive information is intended to broadly mean different types of private and confidential information that a person would want to securely store, and which is accessible to a limited group of persons often consisting of only the user.

A user typically can enter an authentication password at a first user interface of the password manager application to unlock the more secure password-protected second user interface of the password manager application. The certain authentication password has been set (pre-arranged) by, for example, either the user, a developer of the password manager application, a manufacturer of the electronic device, or another person or entity. An authentication system of the password manager application guards access by requiring a user to correctly manually enter a pre-arranged (certain) authentication password at a first user interface of the password manager application before allowing access (unlocking user access) to a second user interface that may make readily accessible to the user sensitive information stored in one or more password records in the password manager application. That is, the authentication system requires that a user enter via an unsecured (or less secure) first user interface of a password manager application a certain authentication password in order to gain access to a secured (or more secured) second user interface of the password manager application.

To improve protection of sensitive information and to enhance the relevance of sensitive information that is accessed from a password manager application under different contexts of use, contextual awareness can be built into the password manager application so that it can intelligently decide what sensitive information (or portion of the sensitive information) to display upon being unlocked. Examples of features and functions of a new and novel context-aware password manager application are discussed herein.

The password manager application can have access to certain contextual information that the password manager application can use as input when deciding what sensitive information to make accessible (e.g. to display) to the user. This contextual information is typically available to the password manager application on many different electronic device platforms, such as, but not limited to, computers, mobile devices, mobile phones, Smart phones, tablets, Personal Information Manager (PIM) devices, laptop PCs, desktop PCs, vehicles, automobile consoles, gaming devices, cameras, television devices, accessory devices, peripheral devices, portable media players, health/medical/fitness devices, smartwatches, headsets, wearable electronic devices, and the like. The term "electronic device", as used in this application, is intended to broadly cover all of these types of electronic devices, and the like.

The contextual information can be received from many different types of context data input devices, as will be discussed in more detail below. One example type of contextual information received from a context data input device is whether the electronic device is wirelessly connected to a WiFi access point, and if so, some identifying information about the access point (e.g., a determined identification of one or more access points in a vicinity of the electronic device) as well. This example contextual information received from a certain context data input device, of course, can include monitoring connections, whether wireless or wired connections, with a plurality of WiFi access points and/or with any one or more other types of communication devices, such as routers, modems, portals, firewalls, virtual private networks, and the like. The term access point, therefore, as used in this application is intended to broadly cover any of the various types of communication access points described above, and the like.

A second example type of contextual information received from a certain context data input device is Geolocation information related to the actual location of the electronic device. Geolocation information may include, in one example, GPS data received from a GPS receiver in the electronic device. Geolocation information, in a second example, can include sensor data monitored by one or more sensors in the electronic device. Geolocation information, in a third example, can include sensor data received by the electronic device from external (external to the electronic device) sensor units in particular locations.

Geolocation information, in a fourth example, can include received cellular network signals that indicate the location of an electronic device relative to reference locations of one or more cellular network base station transmitters. In certain embodiments, according to the fourth example, a triangulation calculation of the electronic device uses received cellular network signals from a plurality of cellular network base stations in the vicinity of the electronic device. The location of each of the plurality of cellular network base stations (cell sites) is a known value. Triangulating the electronic device between the locations of each of the plurality of cellular network base stations can indicate that the electronic device was at a certain location at a certain time. The Geolocation information, according to the fourth example, can include the received cellular network signals from the plurality of cellular network base stations, the triangulation calculation, or a combination of both. While the example for triangulation discussed above uses cellular network signals from cellular network base stations, it should be clear that other communication networks can be used for triangulation calculations. For example, communication signals with a plurality of WiFi access points or WiFi hotspots with known geolocations can be used by the electronic device to perform triangulation calculations to determine a geolocation for the electronic device. Additionally, a received signal strength indication at the electronic device could be used to indicate the distance from the electronic device to other known location transmitters. Any combination of the above examples can be used in various embodiments for the Geolocation information.

The Geolocation information can indicate specific location information for the electronic device that is not necessarily determinable from GPS data alone. For example, a plurality of overlapping maps of a particular geographic region may be identified by a combination of geolocation information from various sources. The electronic device's actual location relative to any one of the overlapping maps may be identified by Geolocation information. As a very specific example, a physically secure area (i.e., only authorized personnel permitted access) inside of a business facility can be identified with Geolocation information. This would contribute to defining a context for a user of the electronic device. When within this physically secure area, for example, certain sensitive information may only be accessible to a user via the unlocked second password-protected user interface of the password manager application.

Time and date information is a third type of contextual information received from a context data input device. This type of time oriented contextual information, for example, can identify whether the electronic device is within certain time periods (e.g., any one or more of time of day, day of week, time range, time period following a certain detected event in the past, or time period within a certain predicted event in the near future.).

These are only non-limiting examples of types of contextual information that can be received from one or more context data input devices and thereby available to a password manager application to determine a context for a user of an electronic device. Other types of contextual information available in an electronic device may be used by the password manager application, as understood by those of ordinary skill. For example, sensors at the electronic device can provide certain biometric information of a user of the electronic device, or can provide other monitored physical information of the user (e.g., heart rate, breathing rate, temperature, moisture of the skin, electrical activity measured at the skin of the user), which can be contextual information received from a context data input device for use by the password manager application in the electronic device.

With the above discussed contextual information, the password manager application would be able to decide whether or not to show certain sensitive information (or certain portion of the sensitive information) at a user interface of the password manager application. For example, higher-sensitivity data could be shown only while being: connected to secure/trusted networks/WiFi access points; within a certain known, secure physical location; within certain time periods (e.g., time of day, day of week, time range, time period following a certain detected event in the past, time period within a certain predicted event in the near future, etc.).

Any combination of the above situations and contextual information could be monitored by the password manager application before the password manager application would decide a password access context exists to allow access to certain sensitive information (or portion of the sensitive information) at the unlocked user interface. According to one example implementation, a first portion and a second portion of the sensitive information are both securely stored in at least one password record in the memory. The first portion is readily accessible with the entry of the password at the first user interface 102. However, to access the second portion of the sensitive information a second password, or a certain password access context, must be detected by the password manager application. After this second condition is met, the second portion of the sensitive information is made accessible in the second user interface 200.

Optionally, according to another example, any combination of the above situations could be monitored before the password manager 320 would decide to allow access to a second portion of the sensitive information of higher sensitivity than the other first portion of the sensitive information that may be immediately accessible (e.g., displayed in a display of the second user interface 200) with the gain of access to the unlocked second user interface 200 of the password manager application 320. That is, a condition based on a level of sensitivity of the particular portion of the sensitive information is part of one or more of the rules used by the password manager application 320 to determine what portion(s) of the sensitive information are made accessible under what certain password access context.

To address a second problem of assisting a user to find the most related (relevant) password record(s), contextual information similar to that contextual information discussed above, can be used. Some example situations will be described below.

As a first example, when one or more password records are added to the password manager application, they may be added at the geolocation where it will later be needed. For example, one has the garage door codes of family members and friends in one's password manager application, which the person typically accesses when arriving at their house. The password manager application could automatically store the geolocation information of where the user was when the user added the password records in the password manager application. The geolocation information was automatically associated with the password records at the time the password records were created by the user. Later, when the user unlocks the password manager application, the password manager application can determine whether the contextual information at that time indicates that the electronic device is located at a geolocation in the vicinity of where the user was when the user added the password record(s). The term "vicinity" is intended to broadly define a geolocation region in proximity to, e.g., within a defined distance range from, a certain geolocation location. As a second example, the user of the electronic device can choose the location when adding/editing the password records in the password manager application. For example a user of the electronic device might be at a work location when the user adds/edits a password record in the password manager application. However, at such time that the user adds/edits the password record the password code added to the password record corresponds to another different location from the current work location. The user of the electronic device can conveniently add in the password record an identification of the other different location associated with the added password code in the password record. The user does not have to wait until the user is at the other different location to add the password code to the password record.

Figure 4:
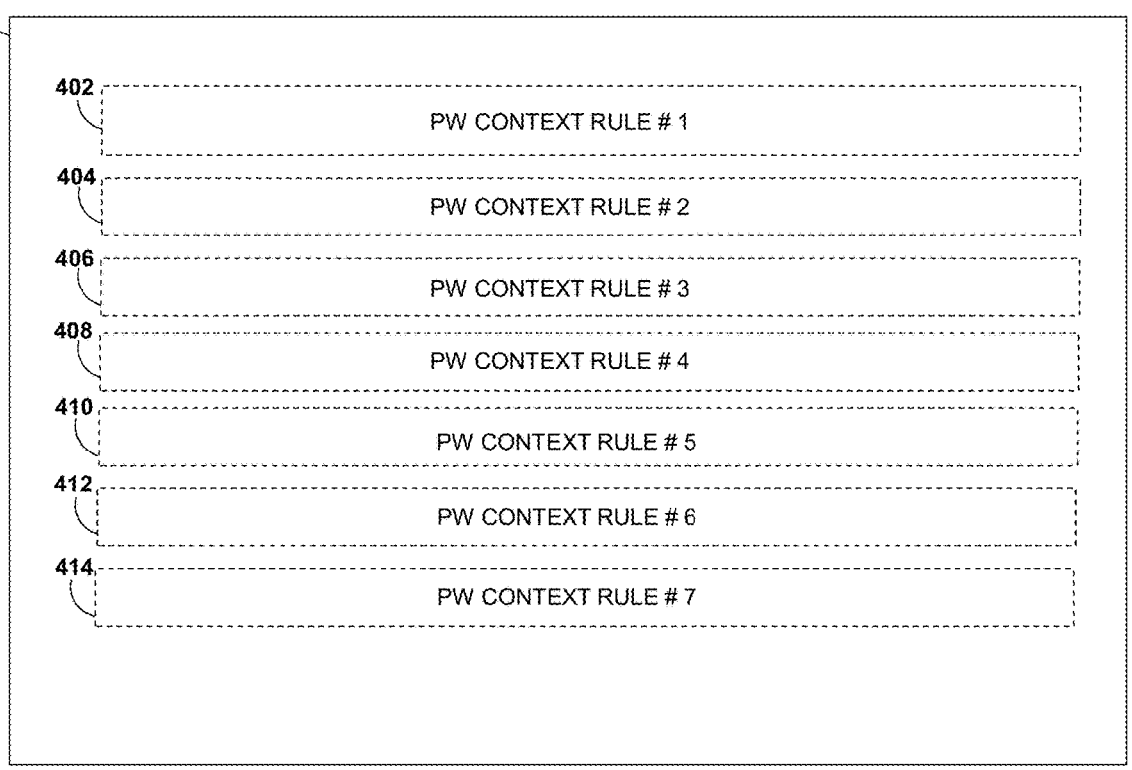
FIG. 4 is a data block diagram illustrating an example of a password context rules database used by the electronic device of FIG. 1.

The password manager application 100, according to an example, includes a set of password access context rules (e.g., stored in context rule records 402, 404, 406, 408, 410, 412, 414), as shown in FIG. 4, that are used to monitor certain contextual information received from one or more context data input devices. This set of rules is stored in the password access rules database 324 shown in FIG. 4. In one example, the password manager application interoperates with the password access context monitor 320, which uses these rules 402, 404, 406, 408, 410, 412, 414, to determine whether the user and the electronic device 100 are in a certain password access context, as will be discussed further below.

In such a case in which the current geolocation information of the electronic device is in the vicinity to where the user previously added one or more password records, the password manager application prioritizes the one or more password records in a list (a prioritized list) of password records which are made available to the user upon the user unlocking the secure user interface of the password manager application. The most relevant password records, in this example based on the vicinity of the electronic device, will be easy for the user to find and use since they are prioritized, for example, at the top of a list of password records accessible upon unlocking the secure user interface of the password manager application.

It should be noted that while the above example describes the password manager application automatically storing and associating the location information with the password records at the time the password records were created by the user, alternatively the user could additionally manually add/update the location information associated with each, or with a collective group of, password records that were created by the user.

As a second example, when a user of the electronic device is using their home Wi-Fi access point, they typically access the VPN password records and certain personal bank account information password records. On the other hand, when the user of the electronic device is using their work Wi-Fi access point, the user typically accesses their desktop PC operating system login, e.g., a Microsoft Windows operating system login. The password manager application can build and track a history for the user of the electronic device of which access point (their home Wi-Fi or their work Wi-Fi) was in use when certain password records were created, updated, or accessed in the unlocked user interface of the password manager application. Over time and use of the electronic device 100 the password manager application 320, and the password access context monitor 322, will use one or more of the rules (e.g., stored in context rule records 402, 404, 406, 408, 410, 412, 414), and the password access context history database 328, to automatically associate the password context history information with each of the certain password records. The password manager application 320 will then prioritize (and re-prioritize as applicable) in a prioritized list sensitive information from those password records that are most relevant to the user of the electronic device while in the vicinity of a particular location (e.g., at home or at work). When the user unlocks the secured user interface 200 of the password manager application 320 the most relevant password records based on the tracked history of the password records, as tracked in the password access context history database 328, will be prioritized on the list and made accessible to the unlocked user interface 200 depending on which access point is (or which one or more access points are) currently connected with and/or in range to the electronic device.

It should be noted that in various embodiments, any password records that are not prioritized in the list will continue to remain secured and inaccessible to the secure user interface of the password manager application under the particular context situation. This feature, according to the various embodiments, discriminates between prioritized and non-prioritized password records and maintains the security of these other (non-prioritized) password records that may otherwise be needlessly made accessible (unsecured) upon the unlocking of the secured user interface of the password manager application.

As a third example, similar rules (e.g., stored in context rule records 402, 404, 406, 408, 410, 412, 414), and procedures to those discussed above can be applied for use of time period related password records, e.g., within a time of day range, day of week, time range, time period following a certain detected event in the past, time period within a certain predicted event in the near future, and the like. Similar rules to those discussed above can be applied for other situations similar to those discussed above as understood by those of ordinary skill in view of the present discussion. The below described systems and methods are directed to an example of a password manager application in an electronic device.

Example of a Password Manager Application Operating in an Electronic Device

To address the various shortcomings of conventional password manager applications, according to one example, provided is a new and novel method for a password manager application operating in an electronic device to provide context-aware access of prioritized sensitive information via a password protected user interface. The sensitive information is presented prioritized in a list of sensitive information based on contextual information monitored from one or more context data input devices in the electronic device. The received contextual information corresponds to a password access context for a user of the password manager application in the electronic device. This prioritized presentation of sensitive information via a password protected user interface (e.g., displayed in a password protected window of the password manager application) effectively allows a user to easily find and use the most relevant sensitive information for a particular password access context situation based on the monitored contextual information. An advantageous benefit is that it reduces the burden on the user to keep track of and find the most relevant sensitive information, e.g., passwords, stored in the password manager application as specifically needed for a particular context and situation for the user.

Figure 2:
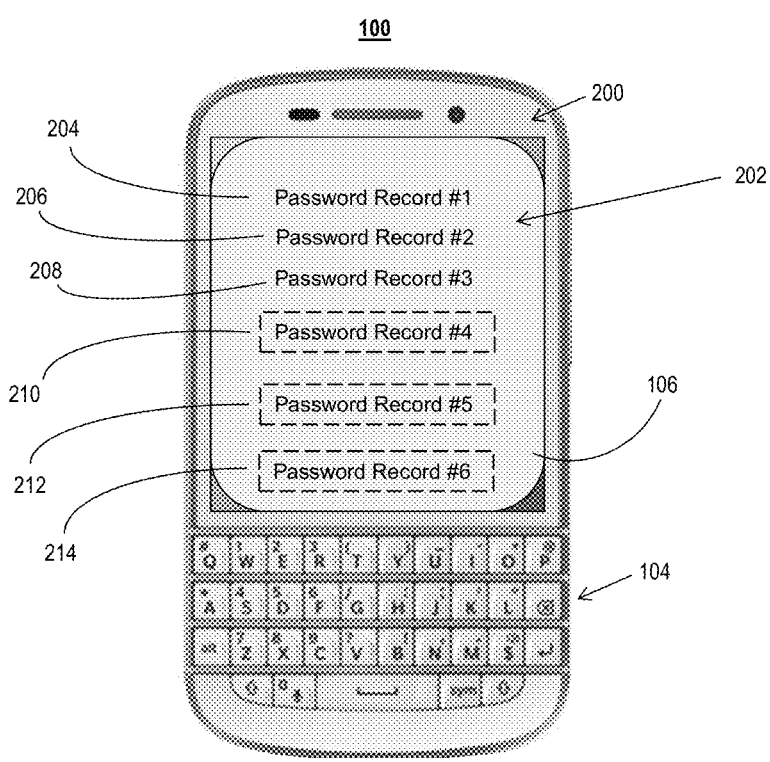
FIG. 2 is an illustration of a second user interface of the electronic device, according to the continuing example.

FIGS. 1 and 2—Example Password User Interfaces

FIG. 1 is an illustration of an example of a first user interface 102 (e.g., a displayed first window interface) of a password manager application operating in an electronic device 100. The electronic device 100 in this example is a mobile phone. FIG. 2 is an illustration of an example of a second user interface 200 (e.g., a displayed second window interface) of the password manager application operating in the electronic device 100. The second user interface 200 is accessible to the user of the electronic device only after unlocking access to the second user interface 200 by a password entry process performed at the first user interface 102.

In both the first and second example user interfaces 102, 200, a keyboard 104 is used as a user input interface. Other types of user input interfaces may be used in various implementations, as will be discussed in more detail below.

In the first user interface 102 a touchscreen display 106 of the electronic device 100 displays password entry information 108 to prompt the user for password entry as shown. The touchscreen display 106 is used as a user output interface. Other types of user output interfaces may be used in various implementations, as will be discussed in more detail below.

As each of the password characters is entered, by pressing keys in the keyboard 104, the respective password entry field in the displayed information 108 indicates the character's entry by displaying an asterisk. In alternative implementations, the actual character of the password can be displayed instead of an asterisk. The display of asterisks enhances the security by reducing the likelihood of another snooping over the user's password entry process and stealing the password being entered. As shown in FIG. 1, seven characters of a password have been entered. Of course, other information can be displayed in the touchscreen display 106 of the electronic device 100 while displaying the password entry information 108 in the first user interface 102.

Referring now more particularly to FIG. 2, a second user interface 200 of the password manager application is shown, according to the example. In this second user interface 200, after being unlocked by the entry of the correct password in the password entry field in the first user interface 102 and thereby authenticating the user as having authorized access, the touchscreen display 106 of the electronic device 100 can display sensitive information 202 from password records stored in the password manager application for the authenticated user of the password manager application. These password records, from which the sensitive information 202 is displayed in the touchscreen display 106 while accessing the second user interface 200 of the password manager application, are prioritized over other password records in a list of password records stored in the password manager application.

In this example shown in FIG. 2, the sensitive information 202 from each of three password records 204, 206, 208, is displayed in the touchscreen display 106 while the password manager application is operating in the second user interface 200. This displayed sensitive information 202 is determined by the password manager application to be the most relevant sensitive information for the user of the password manager application while the user is using the electronic device 100 in a certain password access context.

Other sensitive information, in other password records 210, 212, 214, stored in the password manager application, is not displayed in the touchscreen display 106 while the password manager application is operating in the second user interface 200, in the certain password access context. The password manager application decides what sensitive information to display in the unlocked second user interface 200 based on the determined password access context for the user using the electronic device 100. In this example, three other password records 210, 212, 214, are shown in dashed lines to indicate that while they are stored in the password manager application these records remain inaccessible to the user using the second user interface 200 in the certain password access context. In this way, the sensitive information contained in the password records 210, 212, 214, determined by the password manager application to be irrelevant to the current user's password access context, remains secure.

Example Components of the Electronic Device

Figure 3:
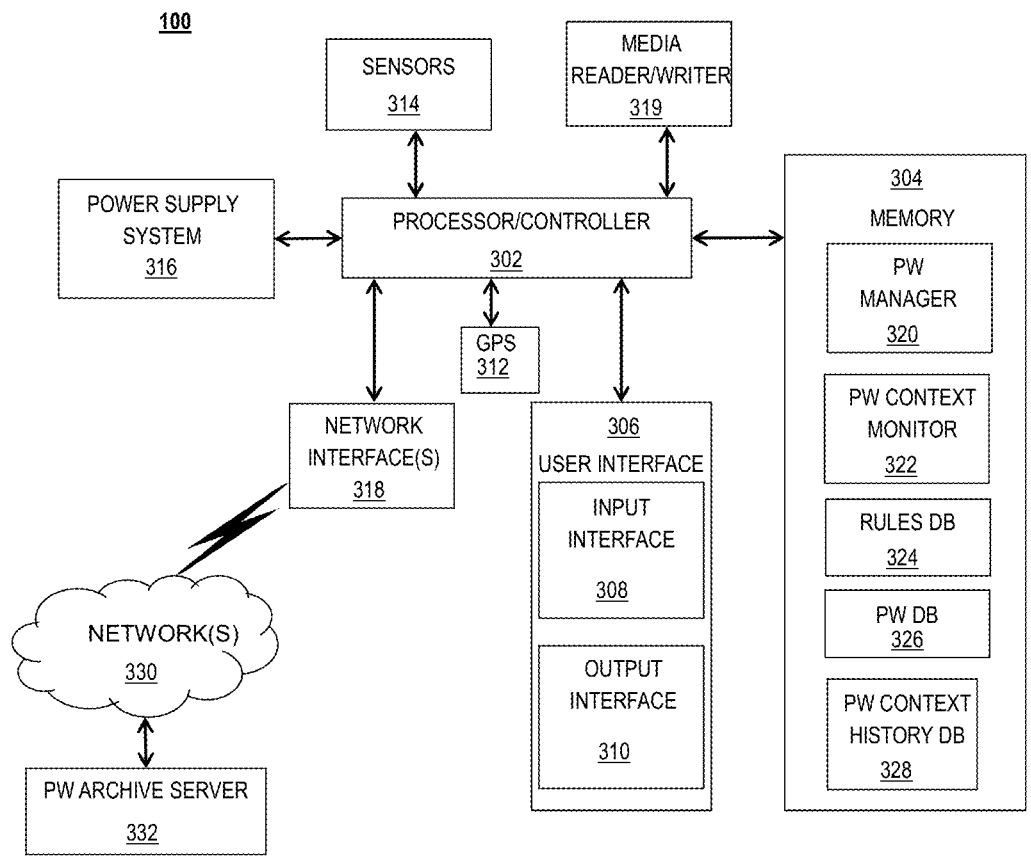
FIG. 3 is a high-level functional block diagram of components of the electronic device of FIG. 1 in a communication system, according to the example.

Referring to FIG. 3, the electronic device 100 discussed above with reference to FIGS. 1 and 2 can include various components. Some of these components that are usable by certain example implementations of the password manager application will be discussed below.

At least one processor/controller 302 is communicatively coupled with memory 304, which can include main memory and persistent (non-volatile) memory. A bus architecture communicatively couples the processor/controller 302 with the memory 304 and other components of the electronic device 100. The bus architecture facilitates communication between the various system components in the electronic device 100.

The processor/controller 302 is communicatively coupled with at least one user interface 306 of the electronic device 100. The user interface 306 comprises a user input interface 308 and a user output interface 310. Examples of elements of the user input interface 314 can include a keyboard 104, a keypad, a mouse, a track pad, a touchpad, a touchscreen, and a microphone that receives audio signals. The received audio signals, for example, can be converted to electronic digital representations of the audio signals and stored in memory 304, and optionally can be used with voice recognition software executed by the processor 302 to receive user input data and commands A biometric sensor can also be a user input interface device that normally can authenticate a user such as by validating a user's fingerprint, a user's eye pattern, a user's voice pattern, and the like.

Examples of elements of the user output interface 312 can include a display 106, a speaker, one or more indicator lights, one or more transducers that generate audible indicators, and a haptic signal generator. Some examples of displays are a liquid crystal display (LCD), a plasma display, an organic light emitting diode (OLED) display, and others. A touchscreen display (also referred to as a touch input screen) functions both as an output interface device and as an input interface device that can receive direct user input taking the form of "touches," "swipes," or "taps."

The processor/controller 302 is communicatively coupled with one or more network interface devices 318. For example, and not for limitation, a network interface device can include at least one wireless communication transceiver device (e.g., at least one wireless communication access point transceiver device). The one or more network interface devices 318 are communicatively coupled with one or more communication networks 330. The network interface device 318 can communicate with one or more communication networks such as a local area network (LAN), a general wide area network (WAN), and/or a public network (e.g., the Internet).

A password archive server 332, according to various examples of an information processing system including the password manager application, can also be communicatively coupled with the one or more communication networks 330. That is, the password archive server 332 can be remotely located from the electronic device 100. The electronic device 100 can communicate with the password archive server 332 via the network interface device 318, as will be discussed in more detail below.

The processor/controller 302, in this example, is communicatively coupled with a GPS receiver 312 which is a context data input device to the password manager application. That is, GPS data received by the GPS receiver 312 (from the GPS receiver wirelessly receiving GPS signals) can be used by the processor/controller 302 to determine a geolocation for the electronic device 100.

The processor/controller 302 is communicatively coupled with one or more sensor devices (or sensors) 314. Sensors 314 can include various types of sensor devices that provide sensor data to the processor/controller 302. For example, geolocation sensors 314 can sense the presence of certain geolocation markers or devices that indicate a geolocation for the electronic device 100 when in the vicinity of such markers or devices which could be used as contextual information for a password manager application in the electronic device 100. As another example, sensors 314 at the electronic device 100 can provide certain biometric information of a user of the electronic device 100, or can provide other monitored physical information of the user (e.g., heart rate, breathing rate, temperature, moisture of the skin, electrical activity measured at the skin of the user), which could be used as contextual information for a password manager application in the electronic device 100.

A power supply system 316 provides power for operating the electronic device 100. The processor/controller 302 is communicatively coupled with the power supply system 316, such as to monitor the level of power of a power source and to take appropriate action based on the determined level of power.

The processor/controller 302 is communicatively coupled with a reader/writer device 319 that reads from and writes to a computer readable medium. The electronic device 100 can typically include a variety of computer readable media. Such computer readable media may be any available media that is accessible by computer systems, and it includes both volatile and non-volatile storage media, and removable and non-removable storage media.

A media reader/writer 319 can be connected to an auxiliary I/O device to allow, for example, loading computer readable program code of a computer program product into the electronic device 100 for storage into memory 304. One example of a media reader 319 is an optical drive such as a CD/DVD drive, which may be used to store data to and read data from a computer readable medium or a computer readable storage product comprising computer readable storage media. Examples of suitable computer readable storage media include optical storage media such as a CD or DVD, magnetic media, or any other suitable data storage device. Media reader/writer 319 is alternatively able to be connected to the electronic device 100 through a data port or computer readable program code is alternatively able to be provided to the electronic device 100 through a wireless network or other network.

According to various examples, a non-volatile memory storage media can be a non-volatile magnetic media (not shown and typically called a "hard drive") or other storage media such as a Flash drive, and the like. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media, can be provided. In such instances, each reader/writer device 319 can be connected to the bus architecture of the electronic device 100 and thereby communicatively coupled with the processor/controller 302.

At least one computer program product can include at least one computer readable medium having a set (e.g., at least one) of program modules stored thereon. The program modules are configured to carry out functions and features of various implementations of the password manager application and other software operating in the electronic device 100.

Programs having a set (at least one) of program modules, and data, may be stored in the computer readable medium and in the memory 304. By way of example, and not limitation, an operating system, one or more application programs, other program modules, and program data, can be stored in memory 304 and in a computer readable medium that is readable and writeable by the media reader/writer device 319. It is contemplated that the computer readable medium and the memory 304 can store a variety of applications, such as the password manager application 320, and other applications such as a calendar application, a telephony application, a web browsing application, a text messaging application, an email client application, and the like (not shown). Each of the operating system, one or more application programs, other program modules, and program data, or some combination thereof, may include an implementation of a networking environment. Program modules generally carry out the functions and features of various examples described herein.

As will be appreciated by one of ordinary skill in the art, a system, a method, or a computer program product, may implement various embodiments of the claimed invention. Accordingly, aspects of the claimed invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the claimed invention may take the form of a computer program product embodied in one or more computer readable medium(s) having computer readable program code embodied thereon. A computer readable storage medium is a non-transitory medium.

In general, the electronic device 100 includes other components to support its operations. Those other components are not illustrated or discussed in this description in order to more clearly describe relevant aspects of the below described example systems and methods.

Example Password Manager Application Operating in the Electronic Device

In general, the at least one processor/controller 302 is configured, via the execution of computer instructions contained in the password manager application module 320, to change the access status of a user interface 200 in the password manager application 320 from locked to unlocked, and vice versa. The password manager application module 320, when executed by the processor/controller 302, can issue instructions to unlock the user interface 200 as shown in FIG. 2. That is, for example, the processor/controller 302, according to the computer instructions in the password manager application module 320, can unlock use (e.g., permit access) of a user interface 200 of the password manager application module 320, that otherwise would be locked and protected from access by the user, such as while using another user interface 102 of the password manager application as shown in FIG. 1.

A password context monitor module 322, while being executed by the processor/controller 302, can monitor one or more context signals from various context data input devices such as have been discussed above. For example, the sensors 314 can be monitored, either individually or in a combination, to receive from the sensors 314 various contextual information that indicate a particular password access context situation for a user of the electronic device 100. Time information can be monitored from a time-clock data source to provide time based contextual information to the password context monitor module 322.

The password context monitor 322, according to the example, can combine the received contextual information from all of the context data input devices, and other information, to determine an occurrence of a certain password access context for the user of the electronic device 100. The password context monitor 322 can provide its detection of certain contextual information, or the detected contextual information itself, to the password manager application module 320.

In this example, the password context monitor 322 uses one or more password context rules to analyze the received contextual information to determine the presence of a certain password access context for the user of the electronic device 100. The one or more rules are stored in password context rule records 402, 404, 406, 408, 410, 412, 414, in a password context rules database 324 in the memory 304. Each of the password context rules can be configured and stored in the password context rules database 324, according to various embodiments, by one or more of the following: the software developer of the password manager application 320, an enterprise software information management administrator, the user at a time of creation of one or more password context rules, the user by updating any of the stored rules in the password context rules database 324, the password manager application 320 interoperating with the password context monitor 322 in the electronic device 100 which can create new rules, or update stored rules, based on any individual or a combination of monitored received contextual information.

In the latter case, the password manager application 320 can include a password access context learning system module (not shown) in memory 304 that can learn new context-based password access conditions and situations for the user of the electronic device 100, and thereby create and store new password access context rules (also referred to as password context rules) in the password context rules database 324, or update existing rules stored in the password context rules database 324.

This learning process can be performed by the processor/controller 302 in near real-time (near the time of occurrence of events and conditions that cause the context input devices to generate contextual information signals). This learning process can be performed by the processor/controller 302 at a time when the electronic device 100 is not in high use conditions, such as while it is idle.

Optionally, this learning process can be performed by the processor/controller 302 communicating and interoperating with a password access context learning system module (not shown) operating on a remote server, such as the password archive server 332. The processor/controller 302 can communicate with the server 332 over the one or more networks 330 and transmit the relevant contextual information (e.g., in data packets that can be delivered across the networks 330) to a password access context learning system module (not shown) operating on the remote server 332. The password access context learning system module processes and analyzes the contextual information received from the electronic device 100, and analyzes any current existing password access context rules for the user of the electronic device 100, to generate a new password access context rule, or to update an existing password access context rule. This new or updated rule is transmitted via one or more message packets, according to the example, from the remote server 332 to the electronic device 100 in which the processor/controller 302 can update one or more password access context rules records in the password context rules database 324 in memory 304. The password context learning system module, in this example, maintains in the remote server 332 a shadow copy of the password access context rules database 324 and the password context history database 328 stored in the electronic device 100. New records, or updated records, in the password access context rules database 324 and the password context history database 328, are copied and transmitted to the remote server 332 via one or more message packets.

The password context monitor 322, according to the continuing example, maintains the detected contextual information in password context history records 502, 504, 506, 508, 510, 512, stored in the password context history database 328 in the memory 304.

Each of the password context history records 502, 504, 506, 508, 510, 512, includes a password pointer, as shown. The password pointer points to one, or more, password records in the password database 326. The pointed to one or more password records are associated with the respective one password context history record 502, 504, 506, 508, 510, 512. A password context history for the collection of context-related password records can be maintained by the one password context history record 502, 504, 506, 508, 510, 512.

Figure 5:
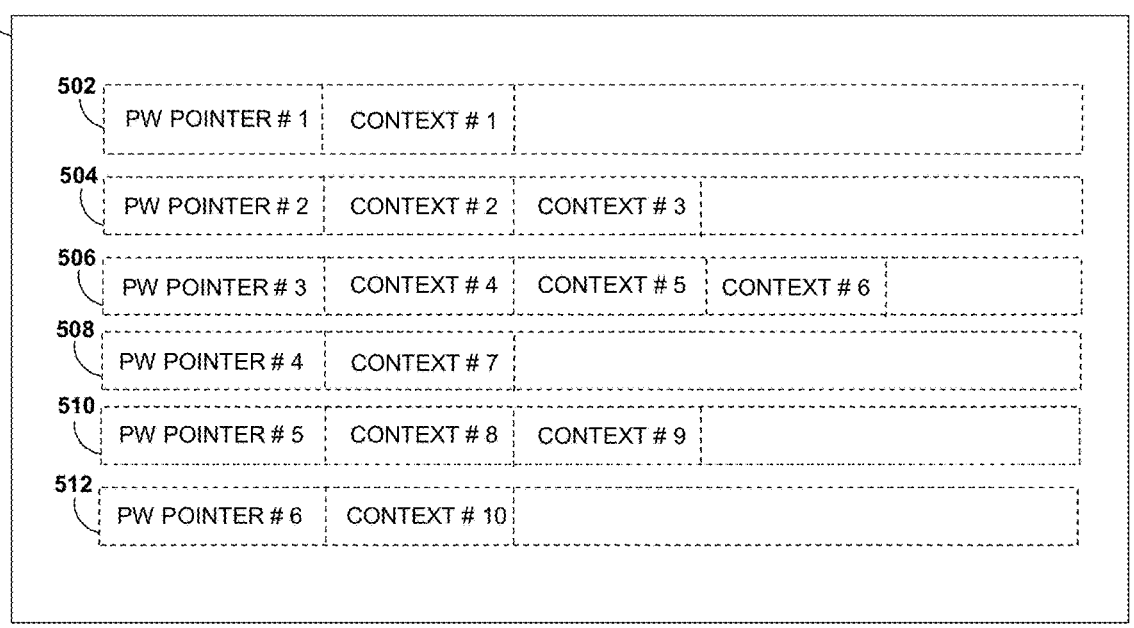
FIG. 5 is a data block diagram illustrating an example of a password context history database used by the electronic device of FIG. 1.

As illustrated in FIG. 5, a first password access context history record 502 contains one stored password access context (e.g., one password access context identifier) in a field of the record 502. The stored password context can include a collection of contextual information signals received by the password context monitor 322 and associated as one password access context event or condition detected by the password context monitor 322. The stored password access context information can be represented by a password context marker (or identifier) stored in the password access context history record 502 by the password context monitor 322. The password context identifier comprises a value resulting from the analysis and determination of a password access context by the password context monitor 322. The password context identifier will normally contain a much smaller amount of data than the collection of contextual information signals, which enhances the utilization of overall storage capacity in the memory 304.

As shown in FIG. 5, a second password access context history record 504 contains two password access contexts (e.g., two password access context identifiers) respectively stored in two fields of the record 504. Each of the two password access contexts can be created as discussed above with reference to the first password context history record 502. However, as more password access contexts are collected and stored in the second password context history record 504, it expands the various events and conditions that will cause prioritization of certain one or more password records in the password database 326 to be made accessible in the unlocked user interface 200.

For example, if a user configures the password manager application 320 to access a certain password record while at home and while at work, then two different password access contexts are stored in the second password access context history record 504. The second password access context history record 504 is associated (by the pointer) with the respective password record. Thereafter, when the user is either at home or at work the password manager application 320 prioritizes the password record, pointed to by the pointer in the second password access context history record 504, to be accessible in the unlocked user interface 200.

The third password context history record 506 shown in FIG. 5 illustrates three different password access contexts collected and stored (e.g., as three password access context identifiers) in the password context history record 506 and associated (by the pointer) with respective one or more context-related password records. Accordingly, when the user is in any of the three different password access contexts, as determined by the password context monitor 322, the password manager application 320 prioritizes the sensitive information from the password record(s), pointed to by the third password access context history record 506, to be accessible in the unlocked second user interface 200.

Figure 6:
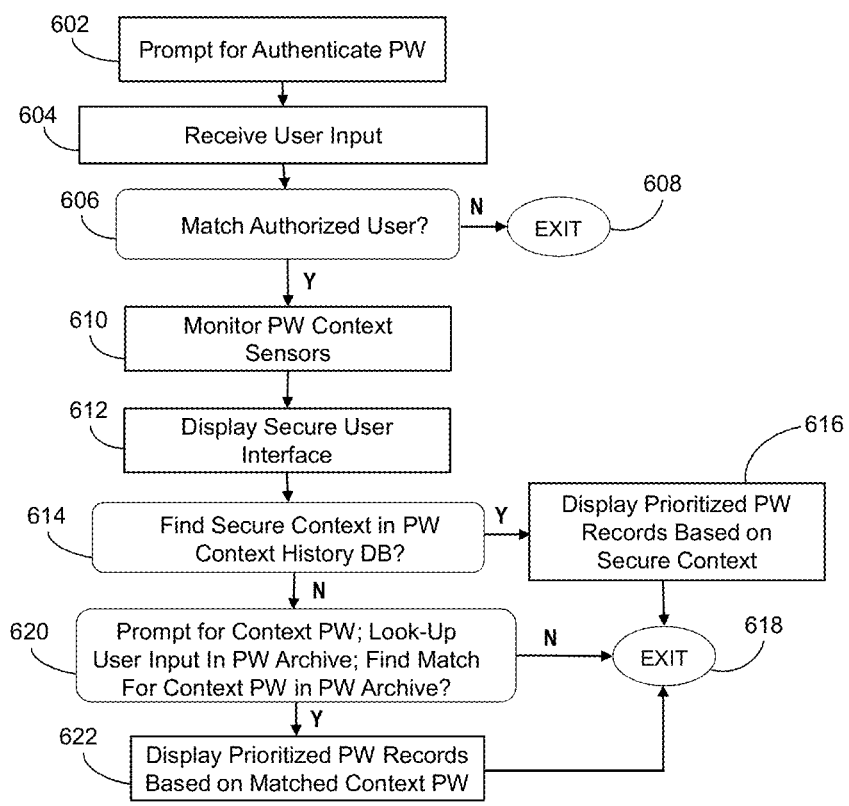
FIG. 6 is a process flow diagram illustrating an example context-aware password access process for the electronic device of FIG. 1.

FIG. 6—Example Context-Aware Password Access Process Overview

FIG. 6 is a process flow diagram illustrating a process for context-aware password access of sensitive information stored in password records in a password manager application 320, according to one example. It should be understood that the password records are not necessarily stored "in the password manager application". Password records may be securely stored in a data structure, e.g., a database, which can be physically and logically separate from the password manager application 320. However, in both cases any user access to these stored password records will be through the secured user interface 200 of the password manager application 320 after unlocking the secured user interface 200. Therefore, the term password records "stored in the password manager application" will be used for brevity to cover broadly all different data structure arrangements for securely storing password records that are user accessible by first unlocking the secured user interface 200 of the password manager application 320.

The example process begins, at step 602, with a password-secured user interface 200 of an electronic device 100 in a locked state. A first user interface 102, which does not provide user access to any password records stored in the password manager application 320, includes a display of information 108 prompting for a password entry to unlock and make accessible sensitive information in the unlocked second user interface 200. After user input is received via a user input interface 308 such as via the keyboard 104, at step 604, the password manager application 320 detects a signal that a password has been entered at the password entry prompt 108. For example, a virtual button displayed with the information 108 prompting for password entry, can be clicked by a user to indicate that password entry is completed. Other alternative modes of indicating completion of password entry are anticipated in the present example, as will be understood by those of ordinary skill in the art.

At step 606, responsive to detecting entry of a password at the first user interface 102, the processor/controller 302 interoperating with the password manager application 320 determines (e.g., using a decryption operation, a hash conversion operation, or a combination of both) whether the entered password matches at least one authorized user password. The authorized user password, according to various embodiments, can be stored in the password manager application 320 as a secure hash code, an encrypted data code, and the like. This authorized user password can be configured in the password manager application 320 by different methods. As one example, a hash of the user's actual authorized password maybe stored. As another example, a key based on the user's actual password may be derived (PKDF #2 for example) and used to decrypt the user's encrypted data securely containing the actual authorized password.

One approach is for the value of the authorized user password, at least an initial value for the authorized user password, is set by a software developer of the password manager application 320. This value of the authorized user password can later be updated by another person, such as by a user of the password manager application 320, by a user of the electronic device 100, and by an administrator of enterprise software for a group who is responsible for the use of the password manager application 320 in the electronic device 100.

A second method is for the value of the authorized user password to be configured, and only updatable, by an enterprise software administrator. In various implementations, the value for the authorized user password may be created, updated, or both, by a user of the electronic device 100, by a user of the password manager application 320, or by another person responsible for the use of the password manager application 320 in the electronic device 100.

If a match is detected, at step 606, the password manager application 320 proceeds to determine a password access context, at step 610. If no matches are found, at step 606, the process is exited, at step 608.

After a match is detected, at step 606, the password context monitor 322 retrieves the contextual information and other information for the current context (e.g., location, time, WiFi access point information), at step 610, to determine the current password access context for the user of the electronic device 100. According to the present example, current context monitoring can be performed by the password context monitor 322 contemporaneously with other operations and activity of the password manager application 320 in real time. As discussed above, contextual information can be received from various context data inputs which, optionally in combination with other information, can be analyzed by the password context monitor 322 to determine the current password access context for the user of the electronic device 100.

For example, the sensors 314 can provide contextual information that is received by the password context monitor 322. The contextual information provided by various types of sensors 314 has been discussed above. As another example, time information can be received from a time/clock source (not shown) as contextual information (determined current time and/or determine current date) for use by the password context monitor 322. As a third example, GPS data from the GPS receiver 312, geolocation sensor information from the sensors 314, or a combination of the GPS data and the geolocation sensor information, can be analyzed by the password context monitor 322 to determine geolocation contextual information (determined current geolocation) for the user of the electronic device 100.

The password context monitor 322 can retrieve password access context history information stored in one or more password access context records in the password access context history database 328. This additional information is used by the password context monitor 322, in combination with contextual information received by the password context monitor 322, to analyze all relevant information and determine a current password access context for the user of the electronic device 100. When the current password access context matches one of the stored password access contexts (e.g., one of the password access context identifiers) in the password context history records 502, 504, 506, 508, 510, 512, the associated password pointer of the respective password context history record is used to find the one or more password records 204, 206, 208, in the password database 326. The sensitive information contained in these pointed to password records 204, 206, 208, is prioritized in being presented in the secure user interface 200 (as illustrated in FIG. 2). Other sensitive information 210, 212, 214, associated with other password records in the password database 326 remains protected and inaccessible via the secure user interface 200.

The password manager application 320, at step 612, displays the secure user interface 200. If the password context monitor 322 finds, at step 614, a current context in the password access context history database 328 that matches the received contextual information, the password context monitor 322 obtains the pointer information from the matching password context history record 502, 504, 506, 508, 510, 512, which points to the one or more password records in the password database 326 that are associated with the found current context. The password context monitor 322 passes this pointer information to the password manager application 320. In this way, the password manager application 320 can retrieve the sensitive information from the pointed to one or more password records in the password database 326. This sensitive information is prioritized in being presented in the secure user interface 200 of the password manager application 320. The password manager application 320, at step 616, displays the sensitive information of the respective prioritized password records in the password database 326. In this example, as illustrated in FIG. 2, the sensitive information 202, including sensitive information 204, 206, 208, from three pointed to password records, is displayed as a list in which the most relevant sensitive information is displayed at the top of the list. The process is then exited, at step 618.

In this example, if the contextual information received by the password context monitor 322 fails, at step 614, to match any password access context information in the password access context records stored in the password access context history database 328, the password context monitor 322 passes an indicator of no-match-found to the password manager application 320. In such a case, according to a first implementation, the password manager application 320 does not prioritize any password records and these records remain not visible (protected and inaccessible) at the secure user interface 200 until a match is found. That is, the process continues monitoring, at step 610. Optionally, while cycling between steps 610, 612, and 614, after a time period of no activity at the secure user interface 200 is reached, the secure user interface 200 goes to a locked state and is replaced with the first user interface 102, and the process goes to prompting, at step 602, for a password entry to unlock and make accessible sensitive information in the unlocked second user interface 200.

Alternatively, according to a second implementation, if the contextual information received by the password context monitor 322 fails, at step 614, to match any password access context information in the password access context records stored in the password access context history database 328, and the password context monitor 322 passes an indicator of no-match-found to the password manager application 320, the password manager application 320, at step 620, displays a prompt in the secure user interface 200 requesting that a secure context password be entered for the current context before any of the protected sensitive information 212, 214, 216, will be displayed in the secure user interface 200.

That is, according to the example, if the password manager application in the electronic device 100 is being used in a context that is not recognized by the password context monitor 322, an additional secure context password must be manually entered in the secure user interface 200 to unlock and display the protected sensitive information 212, 214, 216, that would otherwise remain protected and inaccessible via the secure user interface 200. After password information is manually entered in the secure user interface 200, the password manager application 320 can determine whether the entered password information matches a certain secure context password (e.g., a certain second password) to determine whether to display and make accessible the protected sensitive information 212, 214, 216, in the secure user interface 200.

A first example method of determining whether the entered password information matches a certain secure context password uses a local protected copy of a secure context password stored in memory 304 as a secure hash code, an encrypted data code, and the like. The entered password information is used in a decryption operation, a hash operation, or a combination of both, to determine whether the entered password matches the certain secure context password. If a match exists, the password manager application 320 unlocks access to the protected sensitive information 212, 214, 216, contained in the one or more respective password records in the password database 326. The protected sensitive information is then presented in the secure user interface 200.

According to a more specific example of the first example method, the secure context password can correspond to encrypted information stored securely in the memory 304. To determine a match exists, the entered password information is used as a decryption key applied with decryption algorithm to the encrypted information stored in the memory 304. When the decrypted form of the encrypted information matches a known secret value in the password manager application 320, the entered password information matches the stored secure context password. Upon determining a match exists, at step 620, the password manager application 320 displays, at step 622, sensitive information from the prioritized password record(s) in the secure user interface 200. On the other hand if no match can be determined, at step 620, then the process is exited, at step 618.

Optionally, according to a second example method, to further enhance security of maintaining the secure context password for a particular password manager application 320, the secure context password can be stored in encrypted form (or more generally in other protected form) in the password archive server 332 which is remotely located from the electronic device 100. In this alternative method the password manager application 320 captures the entered password information and sends it (in encrypted form, or using a hash code representing the actual captured password information, or using a combination of both) in a request for lookup message (e.g., comprising at least one look-up request message packet) to the remotely located password archive server 332 via the networks(s) 330. This process is considered performing a lookup in the remotely located password archive server 332 to determine whether a match exists between the entered password information and a secure context password stored in the password archive server 332 for the password manager application 320. The password archive server 332 sends a response message (e.g., comprising at least one response message packet) to the electronic device 100 in response to processing the request for lookup message that was received from the electronic device 100. The response message includes indication of whether a match exists as determined by the password archive server 332. In processing the request for lookup message the password archive server 332, according to a more specific example, uses password information from the request-for-lookup message in a decryption operation, a hash operation, or a combination of both, to determine whether the entered password matches a certain secure context password that is stored in protected form in a memory communicatively coupled to the password archive server 332. In this way, according to the example, the password archive server 332 determines whether a match exists.

Example Information Processing System

The present subject matter can be realized in hardware or a combination of hardware and software. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, which allow a computer to read such computer readable information.

Non-Limiting Examples

Although specific embodiments of the subject matter have been disclosed, those having ordinary skill in the art will understand that changes can be made to the specific embodiments without departing from the scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method of context-aware password management with an electronic device, comprising:

receiving, at a first user interface of a password manager application executing in an electronic device, manual entry of a certain password to unlock user access to sensitive information associated with the password manager application via a password-protected second user interface of the password manager application, the second user interface being separate from the first user interface, the sensitive information including a first portion and a second portion both securely stored in at least one password record in a memory in the electronic device, the first portion of the sensitive information being user accessible via the second user interface, with user access unlocked, only while the password manager application executing in the electronic device determines it is in a certain password access context;

determining, based on contextual information received by a processor from at least one context data input device, whether the password manager application executing in the electronic device is in the certain password access context, in which the at least one context data input device in the electronic device comprises a time-clock data source and at least one wireless communication network transceiver device in the electronic device, the contextual information received from the at least one context data input device comprises:

current time of day contextual information for the electronic device, and communication network identification information received with the at least one wireless communication network transceiver device indicating the electronic device is in communication with a communication network identified with the communication network identification information, and wherein the certain password access context comprises:

a determined current geolocation of the password manager application executing in the electronic device being a certain location, and a determined current time of the password manager application executing in the electronic device being a certain time, the determined certain password access context comprising the certain location and the certain time being associated with at least one password record containing password-related sensitive information and being stored in the password manager application, and the first portion of the sensitive information presented in the prioritized list in the second user interface comprising the password-related sensitive information presented at the top of the prioritized list; and in response to the processor determining, based on user input received by the processor from the first user interface of the password manager application, that manual entry of the certain password has occurred at the first user interface of the password manager application contemporaneous with the determining that the password manager application executing in the electronic device is in the certain password access context, unlocking user access to the first portion of the sensitive information by displaying the first portion in a display of the second user interface of the password manager application in the electronic device, the first portion of the sensitive information being displayed in a prioritized list in the display of the second user interface with the sensitive information most relevant to the user in the certain password access context being displayed at a top of the prioritized list while the second portion of the sensitive information remaining securely stored in the at least one password record in the memory, user inaccessible, and without indication of the second portion displayed in the display of the second user interface, the certain password access context comprising at least one of:

a determined current geolocation of the password manager application executing in the electronic device;

a determined current time of the password manager application executing in the electronic device;

a determined current date of the password manager application executing in the electronic device;

a determined identification of one or more access points currently in a vicinity of the electronic device while the password manager application is executing in the electronic device;

a determined identification of one or more communication networks currently communicating with the electronic device while the password manager application is executing in the electronic device; or a combination of any of the above.

2. The method of claim 1, wherein the first portion and the second portion of the sensitive information, while being securely stored in the at least one password record in the memory, respectively include identification of a first level of sensitivity and a second level of sensitivity greater than the first level of sensitivity.

3. The method of claim 1, in which the at least one context data input device in the electronic device comprises a GPS receiver and at least one geolocation sensor device, the contextual information received from the at least one context data input device in the electronic device comprises current geolocation contextual information for the user of the electronic device, and wherein the certain password access context comprises:

a determined current geolocation of the password manager application executing in the electronic device being in a workplace facility location having physically restricted access to only authorized personnel.

4. The method of claim 1, in which the at least one context data input device in the electronic device comprises a GPS receiver and at least one wireless communication access point transceiver device in the electronic device, the contextual information received from the at least one context data input device comprises:

current geolocation contextual information comprising GPS data received with the GPS receiver indicating the current geolocation of the electronic device, and access point identification information received with the at least one wireless communication access point transceiver device indicating the electronic device is in a vicinity of an access point identified with the access point identification information, and wherein the certain password access context comprises:

a determined current geolocation of the password manager application executing in the electronic device being a certain location, and a determined access point currently in a vicinity of the electronic device being a certain access point identification, the determined certain password access context comprising the certain location and the certain access point identification being associated with at least one password record containing password-related sensitive information and stored in the password manager application, and the first portion of the sensitive information presented in the prioritized list in the second user interface comprising the password-related sensitive information presented at the top of the prioritized list.

5. The method of claim 1, in which the at least one context data input device in the electronic device comprises a biometric sensor in the electronic device, the contextual information received from the at least one context data input device comprises:

user biometric contextual information based on biometric data received with the biometric sensor indicating a current physical characteristic of a user currently using the password manager application in the electronic device, and wherein the certain password access context comprises: a determined current physical characteristic of a user currently using the password manager application in the electronic device being a certain physical characteristic of the user, the determined certain password access context comprising the certain physical characteristic of the user being associated with at least one password record containing password-related sensitive information and stored in the password manager application, and the first portion of the sensitive information presented in the prioritized list in the second user interface comprising the password-related sensitive information presented at the top of the prioritized list.

6. The method of claim 1, wherein the second user interface comprises a password-protected window of the password manager application being displayed in a display of the electronic device, the first portion of the sensitive information displayed in the prioritized list in the window of the password manager application with the most relevant sensitive information presented at the top of the prioritized list.

7. The method of claim 6, wherein the display comprises a touchscreen display, and wherein the prompting for manual entry of a certain password at the first user interface of the password manager application executing in the electronic device, comprises displaying a prompt at a first window of the password manager application being displayed in the touchscreen display of the electronic device, the first window being separate from the password-protected window of the second user interface of the password manager application, the manual entry of the certain password being accepted as user input in the first window of the password manager application.

8. The method of claim 1, wherein the first portion and the second portion of the sensitive information respectively include identification of a first level of sensitivity and a second level of sensitivity greater than the first level of sensitivity, while being securely stored in the at least one password record in the memory and the method further comprising:
prompting, at a display of the second user interface of the password manager application executing in the electronic device, for manual entry of a certain second password to unlock user access to the second portion of the sensitive information associated with the password manager application via the second user interface of the password manager application; and
in response to the processor determining, based on user input received by the processor from the second user interface of the password manager application, that manual entry of the certain second password has occurred at the second user interface of the password manager application, unlocking user access to the second portion of the sensitive information by displaying the second portion in the display of the second user interface of the password manager application in the electronic device, the first portion and the second portion of the sensitive information being displayed in a prioritized list in the display of the second user interface with the sensitive information most relevant to the user being displayed at the top of the prioritized list.

9. The method of claim 8, wherein the certain second password is securely stored in memory communicatively coupled with the processor in the electronic device, and the processor determining an occurrence of the manual entry of the certain second password by:
receiving, with the processor, user input data from a user input device in the second user interface of the password manager application in the electronic device;
comparing, with the processor, the received user input data to the certain second password securely stored in the memory; and
determining, with the processor, that the received user input data matches the certain second password securely stored in the memory.

10. The method of claim 8, wherein the certain second password is securely stored in memory in a remote server communicatively coupled via at least one communication network with the processor in the electronic device, and the processor determining an occurrence of the manual entry of the certain second password by:
receiving, with the processor, user input data from a user input device in the second user interface of the password manager application in the electronic device;
performing, with the processor, a look-up of the received user input data by sending it in at least one look-up request message packet requesting the remote server compare the received user input data to the certain second password securely stored in the memory in the remote server; and
determining, with the processor, that the received user input data matches the certain second password securely stored in the memory in the remote server based on receiving from the remote server a response message packet indicating that the received user input data matches the certain second password securely stored in the memory in the remote server.

11. The method of claim 1, wherein the electronic device is a mobile phone.

12. The method of claim 1, in which a password access context history (PACH) database is stored in the memory, the PACH database including at least one password access context (PAC) record stored in the memory, and the at least one PAC record including at least one password access context (PAC) identifier, the at least one PAC record including at least one pointer associating the PAC record to the at least one password record, and the method further comprising:
determining whether the password manager application executing in the electronic device is in the certain password access context by searching the PACH database to find a PAC record including a PAC identifier that matches the contextual information received by the processor from the at least one context data input device in the electronic device, a match being found indicating that the password manager application executing in the electronic device is in the certain password access context; and
in response to the processor determining that manual entry of the certain password has occurred at the first user interface of the password manager application contemporaneous with determining that the password manager application executing in the electronic device is in the certain password access context, unlocking user access to the first portion of the sensitive information stored in the at least one password record in the memory, by displaying the first portion in the display of the second user interface of the password manager application in the electronic device.

13. The method of claim 12, in which one PAC record including a plurality of PAC identifiers, and the method further comprising:

determining whether the password manager application executing in the electronic device is in the certain password access context by
searching every PAC identifier in the one PAC record, and
searching every PAC record in the PACH database to find a PAC record including a PAC identifier that matches the contextual information received by the processor from the at least one context data input device in the electronic device, a match being found indicating that the password manager application executing in the electronic device is in the certain password access context; and
searching the at least one pointer in the found PAC record to locate the at least one password record associated with the found PAC record and the matching PAC identifier indicating the password manager application executing in the electronic device is in the certain password access context, the located at least one password record containing the sensitive information.

14. An electronic device, comprising:
at least one processor;
a memory, communicatively coupled with the processor, for storing in memory a password manager application that executes with the processor in the electronic device and for storing at least one password record securely containing sensitive information accessible with the password manager application, the password manager application having a first user interface and a password-protected second user interface separate from the first user interface, the sensitive information including a first portion and a second portion both securely stored in at least one password record in the memory in the electronic device;
a touchscreen display, communicatively coupled with the processor, for displaying information associated with the password manager application in at least one of the first user interface and the second user interface of the password manager application executing in the electronic device;
a wireless communication transceiver, communicatively coupled with the processor, for wirelessly communicating with at least one access point device communicatively coupled with at least one communication network;
a GPS receiver for wirelessly receiving GPS signals and providing GPS data to the processor;
one or more sensor devices in the electronic device, communicatively coupled with the processor, for providing sensor data from each of the sensor devices to the processor;
the password manager application, communicatively coupled with the processor, for receiving, at the touchscreen display of the first user interface of the password manager application executing in the electronic device, manual entry of a certain password in the first user interface to unlock user access to password-protected sensitive information associated with the password manager application via the password-protected second user interface of the password manager application, the sensitive information including a first portion and a second portion securely stored in at least one password record in memory in the electronic device, the first portion of the sensitive information being user accessible via the second user interface, with user access unlocked, only while the password manager application executing in the electronic device determines it is in a certain password access context;
a password context monitor, communicatively coupled with the password manager application and the processor, for determining, based on contextual information received by the password context monitor from any of the touchscreen display, the wireless communication transceiver, the GPS receiver, and the one or more sensor devices, in the electronic device, whether the password manager application executing in the electronic device is in the certain password access context, in which the at least one context data input device in the electronic device comprises a GPS receiver and at least one wireless communication access point transceiver device in the electronic device, the contextual information received from the at least one context data input device comprises:
current geolocation contextual information comprising GPS data received with the GPS receiver indicating the current geolocation of the electronic device, and
access point identification information received with the at least one wireless communication access point transceiver device indicating the electronic device is in a vicinity of an access point identified with the access point identification information, and wherein the certain password access context comprises:
a determined current geolocation of the password manager application executing in the electronic device being a certain location, and
a determined access point currently in a vicinity of the electronic device being a certain access point identification, the determined certain password access context comprising the certain location and the certain access point identification being associated with at least one password record containing password-related sensitive information and stored in the password manager application, and the first portion of the sensitive information presented in the prioritized list in the second user interface comprising the password-related sensitive information presented at the top of the prioritized list; and
in response to the password manager application determining, based on user input received from the first user interface, that manual entry of the certain password has occurred at the first user interface of the password manager application contemporaneous with the password context monitor determining that the password manager application executing in the electronic device is in the certain password access context, unlocking user access to the first portion of the sensitive information by displaying the first portion in a display of the second user interface of the password manager application in the electronic device, the first portion of the sensitive information being displayed in a prioritized list in the display of the second user interface with the sensitive information most relevant to the user in the certain password access context being displayed at a top of the prioritized list while the second portion of the sensitive information remaining securely stored in the at least one password record in the memory, user inaccessible, and without indication of the second portion displayed in the display of the second user interface, the certain password access context comprising at least one of:
a determined current geolocation of the password manager application executing in the electronic device;

a determined current time of the password manager application executing in the electronic device;
a determined current date of the password manager application executing in the electronic device;
a determined identification of one or more access points currently in a vicinity of the electronic device while the password manager application is executing in the electronic device;
a determined identification of one or more communication networks currently communicating with the electronic device while the password manager application is executing in the electronic device; or
a combination of any of the above.

15. The electronic device of claim 14, in which a password access context history (PACH) database is stored in the memory, the PACH database including at least one password access context (PAC) record stored in the memory, and the at least one PAC record including at least one password access context (PAC) identifier, the at least one PAC record including at least one pointer associating the PAC record to the at least one password record, and wherein the password context monitor being configured to:
determine whether the password manager application executing in the electronic device is in the certain password access context by searching the PACH database to find a PAC record including a PAC identifier that matches the contextual information received by the password context monitor from at least one context data input device in the electronic device, a match being found indicating that the password manager application executing in the electronic device is in the certain password access context; and
in response to the password manager application determining that manual entry of the certain password has occurred at the first user interface of the password manager application contemporaneous with the password context monitor determining that the password manager application executing in the electronic device is in the certain password access context, unlocking user access to the first portion of the sensitive information stored in the at least one password record in the memory, by displaying the first portion in the display of the second user interface of the password manager application in the electronic device.

16. The electronic device of claim 14, wherein the electronic device is a mobile phone.

17. A computer readable storage medium having computer readable program code embodied therewith, the computer readable program code comprising instructions executable by a processor which, responsive to the instructions, is configured to perform the following method of context-aware password management with an electronic device, the method comprising:
receiving, at a touchscreen display of a first user interface of a password manager application executing in an electronic device, manual entry of a certain password to unlock user access to password-protected sensitive information associated with the password manager application via a password-protected second user interface of the password manager application, the second user interface being separate from the first user interface, the sensitive information including a first portion and a second portion both securely stored in at least one password record in a memory in the electronic device, the first portion of the sensitive information being user accessible via the unlocked second user interface only while the password manager application executing in the electronic device determines it is in a certain password access context;
determining, based on contextual information received by the processor from at least one context data input device in the electronic device, whether the password manager application executing in the electronic device is in the certain password access context, in which the at least one context data input device in the electronic device comprises a time-clock data source and at least one wireless communication network transceiver device in the electronic device, the contextual information received from the at least one context data input device comprises:
current time of day contextual information for the electronic device, and
communication network identification information received with the at least one wireless communication network transceiver device indicating the electronic device is in communication with a communication network identified with the communication network identification information, and wherein the certain password access context comprises:
a determined current geolocation of the password manager application executing in the electronic device being a certain location, and
a determined current time of the password manager application executing in the electronic device being a certain time, the determined certain password access context comprising the certain location and the certain time being associated with at least one password record containing password-related sensitive information and being stored in the password manager application, and the first portion of the sensitive information presented in the prioritized list in the second user interface comprising the password-related sensitive information presented at the top of the prioritized list; and
in response to the processor determining, based on user input received by the processor from the first user interface of the password manager application, that manual entry of the certain password has occurred at the first user interface of the password manager application contemporaneous with the determining that the password manager application executing in the electronic device is in the certain password access context, unlocking user access to the first portion of the sensitive information by displaying the first portion in a display of the second user interface of the password manager application in the electronic device, the first portion of the sensitive information being displayed in a prioritized list in the display of the second user interface with the sensitive information most relevant to the user in the certain password access context being displayed at a top of the prioritized list while the second portion of the sensitive information remaining securely stored in the at least one password record in the memory, user inaccessible, and without indication of the second portion displayed in the display of the second user interface, the certain password access context comprising at least one of:
a determined current geolocation of the password manager application executing in the electronic device;
a determined current time of the password manager application executing in the electronic device;
a determined current date of the password manager application executing in the electronic device;

a determined identification of one or more access points currently in a vicinity of the electronic device while the password manager application is executing in the electronic device;

a determined identification of one or more communication networks currently communicating with the electronic device while the password manager application is executing in the electronic device; or a combination of any of the above.

18. The computer readable storage medium of claim 17, wherein the at least one context data input device in the electronic device comprises a GPS receiver and at least one geolocation sensor device, the contextual information received from the at least one context data input device in the electronic device comprises current geolocation contextual information for the user of the electronic device, and wherein the certain password access context comprises:

a determined current geolocation of the password manager application executing in the electronic device being in a workplace facility location having physically restricted access to only authorized personnel.

19. The computer readable storage medium of claim 17, wherein the at least one context data input device in the electronic device comprises a GPS receiver and at least one wireless communication access point transceiver device in the electronic device, the contextual information received from the at least one context data input device comprises:

current geolocation contextual information comprising GPS data received with the GPS receiver indicating the current geolocation of the electronic device, and access point identification information received with the at least one wireless communication access point transceiver device indicating the electronic device is in a vicinity of an access point identified with the access point identification information, and wherein the certain password access context comprises:

a determined current geolocation of the password manager application executing in the electronic device being a certain location, and a determined access point currently in the vicinity of the electronic device being a certain access point identification, the determined certain password access context comprising the certain location and the certain access point identification being associated with at least one password record containing password-related sensitive information and stored in the password manager application, and the first portion of the sensitive information presented in the prioritized list in the second user interface comprising the password-related sensitive information presented at the top of the prioritized list.

20. The computer readable storage medium of claim 17, in which the at least one context data input device in the electronic device comprises a GPS receiver and at least one wireless communication access point transceiver device in the electronic device, the contextual information received from the at least one context data input device comprises:

current geolocation contextual information comprising GPS data received with the GPS receiver indicating the current geolocation of the electronic device, and access point identification information received with the at least one wireless communication access point transceiver device indicating the electronic device is in a vicinity of an access point identified with the access point identification information, and wherein the certain password access context comprises:

a determined current geolocation of the password manager application executing in the electronic device being a certain location, and a determined access point currently in a vicinity of the electronic device being a certain access point identification, the determined certain password access context comprising the certain location and the certain access point identification being associated with at least one password record containing password-related sensitive information and stored in the password manager application, and the first portion of the sensitive information presented in the prioritized list in the second user interface comprising the password-related sensitive information presented at the top of the prioritized list.

* * * * *